(12) United States Patent
Sarrio et al.

(10) Patent No.: US 11,764,712 B2
(45) Date of Patent: Sep. 19, 2023

(54) METHOD FOR STARTING A SENSORLESS SINGLE-PHASE ELECTRIC MOTOR AND SENSORLESS SINGLE-PHASE ELECTRIC MOTOR

(71) Applicant: PIERBURG PUMP TECHNOLOGY GMBH, Neuss (DE)

(72) Inventors: Oliver Sarrio, Cologne (DE); Felix Wuebbels, Duesseldorf (DE); Miso Boskovski, Meerbusch (DE); Oliver Fingel, Rheinberg (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 0 days.

(21) Appl. No.: 17/633,961

(22) PCT Filed: Aug. 21, 2019

(86) PCT No.: PCT/EP2019/072405
§ 371 (c)(1),
(2) Date: Feb. 9, 2022

(87) PCT Pub. No.: WO2021/032302
PCT Pub. Date: Feb. 25, 2021

(65) Prior Publication Data
US 2022/0294370 A1 Sep. 15, 2022

(51) Int. Cl.
*H02P 6/21* (2016.01)
*H02P 6/182* (2016.01)
(Continued)

(52) U.S. Cl.
CPC ............... *H02P 6/21* (2016.02); *H02P 6/182* (2013.01); *H02P 6/26* (2016.02); *H02P 6/28* (2016.02); *H02P 2207/05* (2013.01)

(58) Field of Classification Search
CPC .. H02P 21/34; H02P 6/182; H02P 6/21; H02P 6/26; H02P 6/28; H02P 1/465
See application file for complete search history.

(56) References Cited

U.S. PATENT DOCUMENTS

| 5,598,071 A * | 1/1997 | Dunfield | H02K 29/03 |
|---|---|---|---|
| | | | 318/400.29 |
| 6,906,484 B1 * | 6/2005 | Berroth | H02P 6/085 |
| | | | 318/434 |

(Continued)

FOREIGN PATENT DOCUMENTS

| GB | 2500014 A | 9/2013 |
|---|---|---|
| JP | 2000-102283 A | 4/2000 |

*Primary Examiner* — Thai T Dinh
(74) *Attorney, Agent, or Firm* — Norman B. Thot

(57) ABSTRACT

A method for starting a sensorless single-phase electric motor. The electric motor includes a permanent magnetic motor rotor, an electromagnetic motor stator having a stator coil, a power electronics which energizes the stator coil, a current sensor which measures a current flowing in the stator coil, and a control electronics which controls the power electronics. The control electronics is connected with the current sensor. The method includes energizing the stator coil with an alternating drive voltage, monitoring a drive current which is generated in the stator coil by the alternating drive voltage, and commutating the alternating drive voltage whenever the drive current reaches a predefined positive current threshold value or a predefined negative current threshold value.

7 Claims, 3 Drawing Sheets

(51) Int. Cl.
    *H02P 6/26*    (2016.01)
    *H02P 6/28*    (2016.01)

(56) References Cited

U.S. PATENT DOCUMENTS

| | | | |
|---|---|---|---|
| 7,459,878 B2* | 12/2008 | Wang | H02P 6/182 |
| | | | 318/788 |
| 9,088,238 B2* | 7/2015 | Bateman | H02P 6/26 |
| 9,973,118 B2* | 5/2018 | Lin | H02P 6/26 |
| 2010/0253250 A1* | 10/2010 | Marvelly | H02P 6/26 |
| | | | 361/87 |
| 2013/0234631 A1* | 9/2013 | Bateman | H02P 6/185 |
| | | | 318/400.01 |
| 2013/0234633 A1 | 9/2013 | Bateman | |
| 2014/0111127 A1 | 4/2014 | Bi | |
| 2018/0316297 A1* | 11/2018 | Uemura | H02P 6/06 |
| 2019/0013757 A1* | 1/2019 | Leman | H02P 6/26 |

* cited by examiner

METHOD FOR STARTING A SENSORLESS SINGLE-PHASE ELECTRIC MOTOR AND SENSORLESS SINGLE-PHASE ELECTRIC MOTOR

CROSS REFERENCE TO PRIOR APPLICATIONS

This application is a U.S. National Phase application under 35 U.S.C. § 371 of International Application No. PCT/EP2019/072405, filed on Aug. 21, 2019. The International Application was published in English on Feb. 25, 2021 as WO 2021/032302 A1 under PCT Article 21(2).

FIELD

The present invention is directed to a method for starting a sensorless single-phase electric motor and to a sensorless single-phase electric motor.

BACKGROUND

Sensorless single-phase electric motors do not comprise a position sensor for detecting a present motor rotor position as does, for example, a Hall sensor. The present rotor position must therefore be indirectly detected, for example, by analyzing transitions in the polarity of a counter-electromotive force (CEMF) caused by a rotating permanent-magnetic motor rotor. However, indirect sensorless rotor position detection methods known in the art typically require the motor rotor to rotate with at least a minimum speed in order to provide a reliable rotor position detection. A specific acceleration procedure is therefore required to accelerate the motor rotor up to this minimum speed.

US 2014/0111127 A1 describes a method for starting a sensorless single-phase electric motor wherein the motor rotor is initially moved into a defined rotor rest position by energizing the stator coil with a defined positioning current. The motor rotor is subsequently accelerated in an acceleration drive mode, wherein the stator coil is energized with a pulsed alternating current provided with a predefined duty cycle so that the CEMF can be analyzed in the OFF-phase of the pulsed current, i.e., when the stator coil is not energized. However, the necessary off-phases of the pulsed drive current limit the effective drive energy provided to the stator coil so that the pulsed drive current only allows for a relatively slow motor rotor acceleration. The relatively slow initial positioning of the motor rotor additionally slows down the starting of the electric motor.

SUMMARY

An aspect of the present invention is to provide a fast and reliable starting of a sensorless single-phase electric motor.

In an embodiment, the present invention provides a method for starting a sensorless single-phase electric motor. The electric motor includes a permanent magnetic motor rotor, an electromagnetic motor stator comprising a stator coil, a power electronics which is configured to energize the stator coil, a current sensor which is configured to measure a current flowing in the stator coil, and a control electronics which is configured to control the power electronics. The control electronics is connected with the current sensor. The method includes energizing the stator coil with an alternating drive voltage, monitoring a drive current which is generated in the stator coil by the alternating drive voltage, and commutating the alternating drive voltage whenever the drive current reaches a predefined positive current threshold value or a predefined negative current threshold value.

BRIEF DESCRIPTION OF THE DRAWINGS

The present invention is described in greater detail below on the basis of embodiments and of the drawings in which.

DETAILED DESCRIPTION

Figure 1:
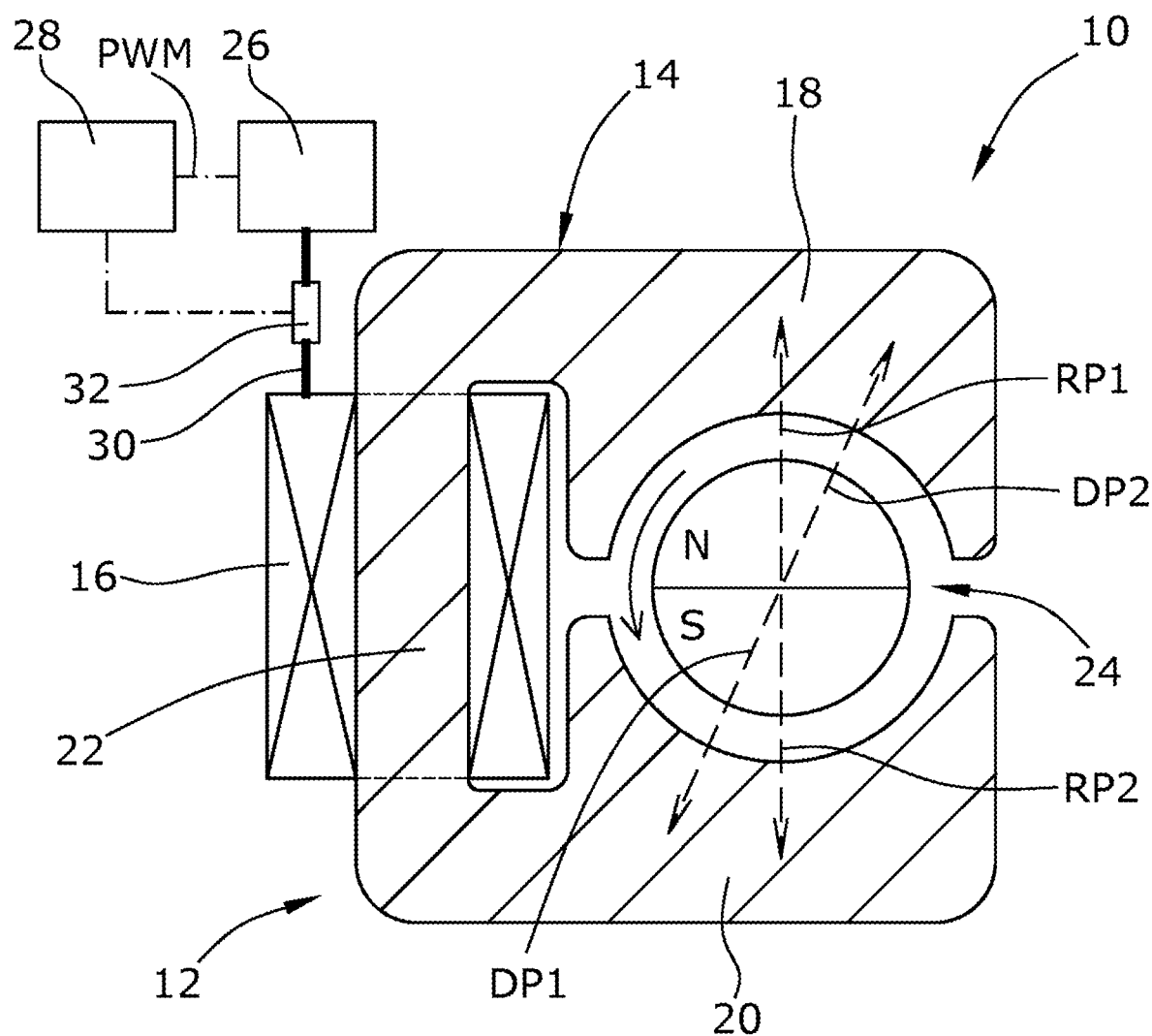
FIG. 1 shows a schematic illustration of a sensorless single-phase electric motor according to the present invention, wherein a motor rotor is oriented in a first rest position.

The sensorless single-phase electric motor according to the present invention is provided with a permanent magnetic motor rotor. The motor rotor can either be a monolithic rotor body which is permanently magnetized or, alternatively, a typical ferromagnetic rotor body with at least one attached permanent magnet. The motor rotor of the single-phase electric motor is typically provided with exactly two opposite magnetic poles.

The sensorless single-phase electric motor according to the present invention is also provided with a motor stator with a stator coil. The motor stator can, for example, comprise a substantially U-shaped ferromagnetic stator body defining two opposite magnetic poles. The single-phase electric motor is typically provided with a single stator coil which is located opposite to the open end of the U-shaped stator body. The motor stator can, for example, be provided with a laminated stator body, i.e., the stator body is made of a stack of ferromagnetic metal sheets.

The motor rotor moves into one of two defined static rest positions if the motor stator is not energized due to the interaction of the permanent-magnetic motor rotor and the ferromagnetic stator. If the stator coil is energized with a defined voltage, the motor rotor is accelerated toward one of two drive positions depending on the magnetic orientation of the electromagnetic stator field and, as a result, depending on the polarity of the provided voltage.

The motor stator and the motor rotor according to the present invention are designed so that the two rest positions of the motor rotor are located at different rotational positions than the two drive positions. This allows for a reliable starting of the resting motor rotor.

The sensorless single-phase electric motor according to the present invention is also provided with a power electronics for energizing the stator coil with a defined feed voltage. The power electronics typically comprises several semiconductor switches for commutating the feed voltage.

The sensorless single-phase electric motor according to the present invention is also provided with current sensor for measuring a current flowing in the stator coil. The current sensor can, for example, comprise a simple sense resistor which is electrically connected in series with the stator coil. The current sensor can, however, be any device that allows the present electrical current flowing in the stator coil to be measured.

The sensorless single-phase electric motor according to the present invention is also provided with a control electronics for controlling the power electronics. The control electronics is electrically connected with the current sensor so that the control electronics can evaluate the current being measured by the current sensor. The control electronics typically comprises a microcontroller.

The method for starting a sensorless single-phase electric motor according to the present invention comprises the following steps:

Energizing the stator coil with an alternating drive voltage;

Monitoring a drive current being generated in the stator coil by the drive voltage; and Commutating the drive voltage each time the drive current reaches a predefined positive current threshold value or a predefined negative current threshold value.

The stator coil is energized with the alternating drive voltage which is provided with a defined effective voltage amplitude. The energized stator coil generates an electromagnetic stator field which, depending on the present electrical polarity of the drive voltage, accelerates the motor rotor out of its static rest position and towards one of the two drive positions in which the permanent-magnetic rotor field is parallel to the electromagnetic stator field, i.e., the motor rotor north pole is located adjacent to the motor stator south pole and the motor rotor south pole is located adjacent to the motor stator north pole.

The drive current generated in the stator coil depends on the magnetic orientation of the motor rotor, i.e., the orientation of the permanent-magnetic rotor field, with respect to the electromagnetic stator field. If the motor rotor north pole is located adjacent to the motor stator south pole and the motor rotor south pole is located adjacent to the motor stator north pole, the permanent-magnetic rotor field is parallel to the electromagnetic stator field so that the permanent-magnetic rotor field enhances the total effective stator field. This causes a relatively high drive current, wherein the stator field enhancement and, as a result, the drive current, is at a maximum at the drive position. The stator current therefore continuously increases if the motor rotor is moved toward the drive position.

The present invention provides that the drive voltage is commutated, i.e., the electrical polarity of the drive voltage is inversed, each time the drive current reaches a predefined positive or negative current threshold value, wherein both current threshold values are defined to be lower than a maximum drive current generated in the stator coil when the motor rotor is located in one of the two drive positions. The drive voltage is thereby always commutated before the motor rotor reaches the drive position, wherein the specific orientation of the motor at the commutation point can be defined by the current threshold values. The positive current threshold value and the negative current threshold value are typically equal. The two current threshold values can, however, also be defined to be different if the motor rotor and/or motor stator are/is not perfectly symmetrical. The positive and negative current threshold values are in any case defined so that the drive voltage is commutated substantially symmetrical to provide an efficient starting of the motor rotor.

The method according to the present invention provides a rotor-position-controlled commutation without having a direct rotor position feedback. The method according to the present invention also allows for a substantially continuous energizing of the stator coil which does not require any significant off-time for determining the present rotor position. The method according to the invention therefore provides for an efficient, a fast, and a reliable starting of the sensorless single-phase electric motor.

The drive voltage is typically generated based on a pulse-width-modulated drive signal (i.e., the drive voltage is constantly switched on and off with a defined switching frequency), wherein the effective drive voltage amplitude is defined by the duty cycle (i.e., the on-time ratio) of the pulse-width-modulated drive signal. The pulse-width-modulation provides for a relatively simple adjustment of the effective drive energy fed into the stator coil. The duty cycle of the drive signal can, for example, be continuously increased up to a predefined set duty cycle during a ramp phase. The effective drive energy is thereby continuously increased during the ramp phase which, due to the current-threshold-based commutation, causes a continuous increase of the drive voltage alternation frequency. This provides that the permanent-magnetic motor rotor can "follow" the generated electromagnetic stator field and, as a result, provides a reliable starting of the electric motor.

In an embodiment of the present invention, the method comprises an initial magnetic orientation detection procedure with the following steps:

Energizing the stator coil with a positive detection voltage pulse with a positive electrical polarity;

Energizing the stator coil with a negative detection voltage pulse with a negative electrical polarity;

Measuring a positive detection current pulse which is generated in the stator coil by the positive detection voltage pulse;

Measuring a negative detection current pulse which is generated in the stator coil by the negative detection voltage pulse;

Determining a first detection parameter by evaluating the positive detection current pulse;

Determining a second detection parameter by evaluating the negative detection current pulse; and Determining a magnetic orientation of the resting motor rotor by comparing the first detection parameter with the second detection parameter.

As already described above, the permanent-magnetic rotor field enhances the total effective stator field if the rotor field is parallel to the stator field, i.e., if each magnetic rotor pole is located adjacent to a magnetic stator pole with an opposite magnetic polarity, which causes a relatively high stator current. The permanent-magnetic rotor field in contrast weakens the total effective stator field if the rotor field is antiparallel to the stator field, i.e., if each magnetic rotor pole is located adjacent to a magnetic stator pole with an identical magnetic polarity. This causes a relatively low stator current.

According to the present invention, the stator coil is subsequently energized with the positive detection voltage pulse and with the negative detection voltage pulse. The positive detection voltage pulse generates a positive stator field, and the negative detection voltage pulse generates a negative stator field with an opposite magnetic orientation. Both detection voltage pulses are provided to be low and short so that the resting motor rotor is not significantly moved by the two detection voltage pulses.

The resulting detection current pulse generated in the stator coil is measured for each detection voltage pulse. A first detection parameter is determined by evaluating the positive detection current pulse, and a second detection parameter is determined by evaluating the negative detection current pulse. The detection parameters can, for example, be the maximum value, an average value, or an integrated value of the respective detection current pulse.

If the permanent-magnetic rotor field has a component which is parallel to the positive stator field, the first detection parameter is higher than the second detection parameter. If the permanent-magnetic rotor field has a component which is parallel to the opposite negative stator field, the first detection parameter is higher than the second detection parameter.

The magnetic orientation of the resting motor rotor, i.e., the present rest position of the resting motor rotor, can therefore be determined in a simple manner by comparing the first detection parameter with the second detection parameter.

The magnetic orientation detection procedure according to the present invention provides for a reliable detection of the present magnetic orientation even with relatively short detection voltage pulses. The magnetic orientation detection procedure according to the present invention therefore allows a very fast and reliable starting of the sensorless single-phase electric motor.

The described rotor orientation detection procedure can be used to determine the present magnetic orientation of the motor rotor independent of the method used for subsequently driving the motor rotor. The described rotor orientation detection procedure therefore represents an independent invention.

The difference between the positive detection current pulse and the negative detection current pulse is typically relatively small. The stator coil can, for example, therefore be energized with at least three positive detection voltage pulses and with at least three negative detection voltage pulses. Each detection voltage pulse has substantially the same effective amplitude and duration, wherein all detection voltage pulses are low and short so that the motor rotor is not moved significantly by the generated electromagnetic stator field. The positive and negative detection voltage pulses can, for example, be provided to the stator coil alternately so that slight rotor movements caused by the positive and the negative detection voltage pulses compensate each other.

The resulting detection current pulse is measured for each detection voltage pulse so that at least three positive detection current pulses and at least three negative detection current pulses are measured. The first detection parameter is determined by adding up the maximum absolute values of all positive detection current pulses, and the second detection parameter is determined by adding up the maximum absolute values of all negative detection current pulses. The difference between the first detection parameter and the second detection parameter is therefore significantly enhanced compared to evaluating only two opposite detection voltage pulses. The same technical effect is achieved by adding up, for example, average values or integrated values of all measured detection current pulses for each detection voltage polarity. This provides for a very reliable detection of the magnetic orientation of the resting motor rotor.

In an embodiment of the present invention, the drive voltage can, for example, be provided with a defined initial electrical polarity which is defined based on the determined magnetic orientation of the resting motor rotor. The drive voltage can, for example, be provided with a positive initial polarity if the motor rotor rests in the first rest position, and drive voltage can, for example, be provided with a negative initial polarity if the motor rotor rests in the second rest position, or vice versa. The initial electrical polarity is in any case provided so that the motor rotor is reliably accelerated with a defined rotational direction independent of its present magnetic orientation. This provides a reliable starting of the electric motor with a defined rotational direction.

The present invention also provides a sensorless single-phase electric motor as described above, wherein the control electronics is configured to execute one of the described methods according to the present invention.

An embodiment of the present invention is described below under reference to the drawings.

FIG. 1 shows a sensorless single-phase electric motor 10 comprising an electromagnetic motor stator 12 with a ferromagnetic stator body 14 and a single stator coil 16. The stator body 14 is designed as a so-called laminated stator body, i.e., the stator body 14 is made of a stack of ferromagnetic metal sheets. The stator body 14 is provided substantially U-shaped, wherein a first pole leg 18 defines a first stator pole and an opposite second pole leg 20 defines a second stator pole. The stator coil 16 is arranged satellite-like at a bridge portion 22 mechanically and magnetically connecting the two pole legs 18,20.

The electric motor 10 also comprises a rotatable permanent-magnetic motor rotor 24. The electric motor 10 is diametrically magnetized thereby defining a magnetic north pole N and a magnetic south pole S.

The electric motor 10 also comprises a power electronics 26 and control electronics 28. The power electronics 26 is electrically connected with the stator coil 16 via a stator connection line 30 for energizing the stator coil 16 with a defined effective feed voltage V. The power electronics 26 is controlled by the control electronics 28 via a pulse-width-modulated drive signal PWM, wherein an effective amplitude of the feed voltage V is controlled via the duty cycle D (i.e., the on-time ratio) of the pulse-width-modulated drive signal PWM. The control electronics 28 is also configured to control an electrical polarity of the feed voltage V.

If the stator coil 16 is not energized, the motor rotor 24 moves into one of two static rest positions RP1,RP2 with opposite magnetic orientations of the motor rotor 24. The two rest positions RP1,RP2 of the motor rotor 24 are schematically illustrated in FIG. 1 by arrows representing the orientation of the magnetic north pole N for the first rest position RP1 and the second rest position RP2, respectively. FIG. 1 shows that the magnetic north pole N of the motor rotor 24 points toward the first pole leg 18 in the first rest position RP1 and points toward the second pole leg 20 in the second rest position RP2.

If the stator coil 16 is energized with a positive feed voltage V, a positive electromagnetic field is generated, wherein the first pole leg 18 provides a magnetic north pole N and the second pole leg 20 provides a magnetic south pole S. If the stator coil 16 is energized with a negative feed voltage V, a negative electromagnetic field is generated, wherein the first pole leg 18 provides a magnetic south pole S and the second pole leg 20 provides a magnetic north pole N.

The positive electromagnetic field accelerates the motor rotor 24 toward a first drive position DP1 in which the magnetic north pole N of the motor rotor 24 points toward the second pole leg 20. The negative electromagnetic field accelerates the motor rotor 24 toward a second drive position DP2 in which the magnetic north pole N of the motor rotor 24 points toward the first pole leg 18. The two drive positions DP1,DP2 are schematically illustrated in FIG. 1 by arrows representing the orientation of the magnetic north pole N for the first drive position DP1 and the second drive position DP2 of the motor rotor 24, respectively.

The electric motor 10 also comprises a current sensor 32 which is arranged in the stator connection line 30 to measure an electric feed current I flowing through the stator connection line 30 and, as a result, flowing through the stator coil 16. The current sensor 32 is connected with the control electronics 28 so that the present electric feed current I can be evaluated by the control electronics 28.

The control electronics 28 is configured to execute an initial rotor orientation detection procedure. In the rotor orientation detection procedure, the power electronics 26 is controlled by the control electronics 28 to alternately energize the stator coil 16 with three positive detection voltage pulses Vp and with three negative detection voltage pulses Vn as schematically illustrated in a) of FIG. 2. Each positive detection voltage pulse Vp is provided with a positive electrical polarity and generates a positive electromagnetic detection field. Each negative detection voltage pulse Vn is provided with a negative electrical polarity and generates an opposite negative electromagnetic detection field.

The resulting feed current I is monitored by the control electronics 28 via the current sensor 32. As schematically illustrated in b) of FIG. 2, the three positive detection voltage pulses Vp generate three positive detection current pulses Ip, and the three negative detection voltage pulses Vn generate three negative detection current pulses In. Each positive detection current pulse Ip has a maximum absolute value of about I1, and each negative detection current pulse In has a maximum absolute value of about I2 being greater than I1.

The control electronics 28 determines a first detection parameter P1 by evaluating all positive detection current pulses Ip, in particular by adding up maximum absolute values of the three positive detection current pulses Ip. The control electronics 28 determines a second detection parameter P2 by evaluating all negative detection current pulses In, in particular by adding up maximum absolute values of the three negative detection current pulses In.

The control electronics 28 compares the determined first detection parameter P1 and second detection parameter P2 to determine the present magnetic orientation of the resting motor rotor 24, i.e., the present static rotor rest position.

If the motor rotor 24 is oriented in the first rest position RP1 (i.e., the magnetic north pole N is located adjacent to the first pole leg 18), the generated positive electromagnetic field is weakened and the generated negative electromagnetic field is enhanced by the permanent-magnetic field of the motor rotor 24. If the motor rotor 24 is oriented in the second rest position RP2 (i.e., the magnetic north pole N is located adjacent to the second pole leg 20), the generated positive electromagnetic field is enhanced and the generated negative electromagnetic field is weakened by the permanent-magnetic field of the motor rotor 24. If the motor rotor 24 is oriented in the first rest position RP1, the determined second detection parameter P2 is therefore higher than the determined first detection parameter P1, and if the motor rotor 24 is oriented in the second rest position RP2, the determined first detection parameter P1 therefore is higher than the determined second detection parameter P2.

Figure 2:
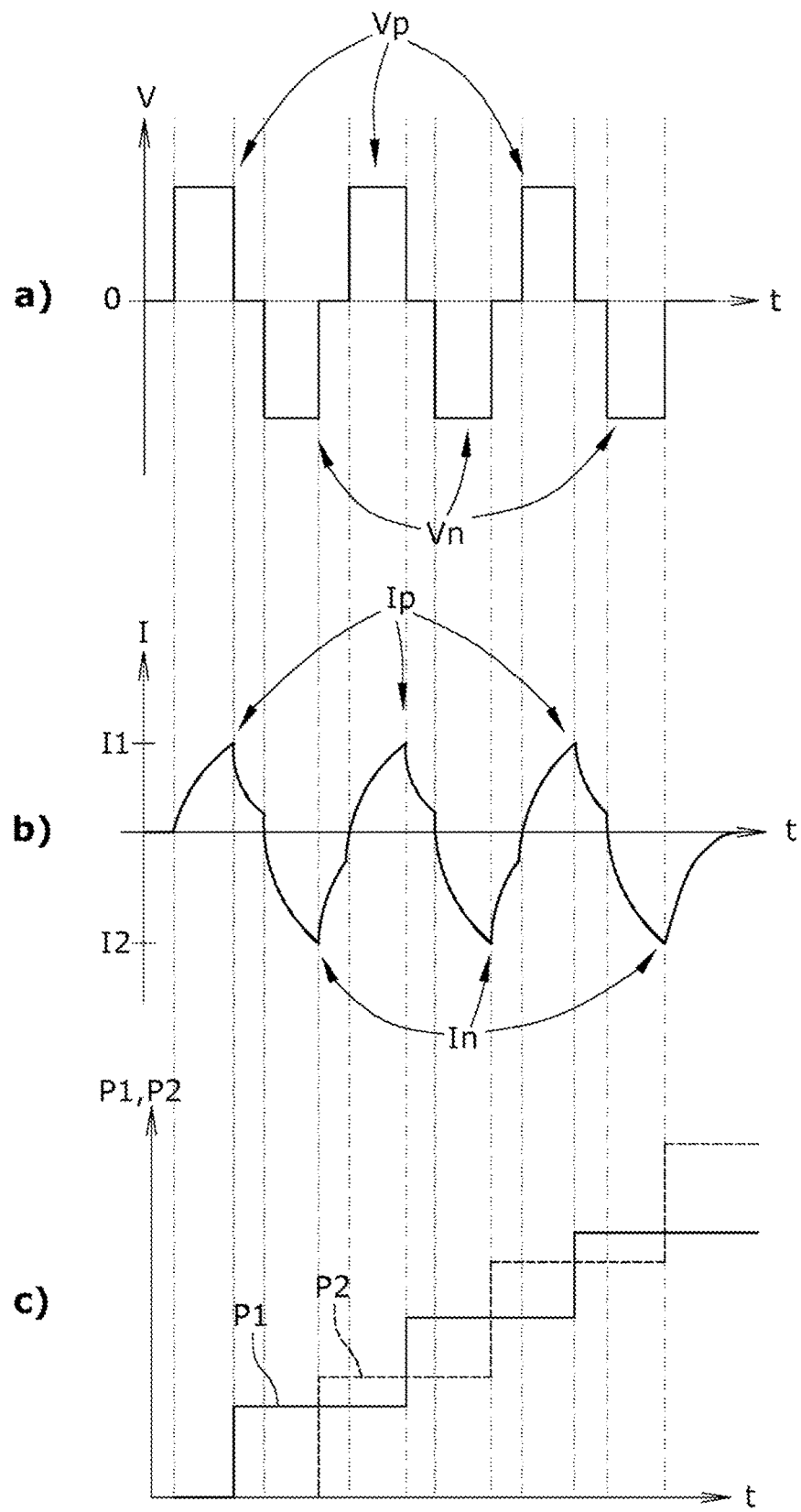
FIG. 2 shows a temporal course of a) a feed voltage b) a feed current and c) a first detection parameter and second detection parameter during an initial rotor orientation detection procedure.

As schematically illustrated in c) of FIG. 2, the determined second detection parameter P2 is significantly higher compared to the determined first detection parameter P1. In the described case, the resting motor rotor 24 is therefore oriented in the first rest position RP1 as illustrated in FIG. 1.

The control electronics 28 is configured to subsequently execute an acceleration procedure to accelerate the resting motor rotor 24. In the acceleration procedure, the control electronics 28 controls the power electronics 26 to energize the stator coil 16 with an alternating drive voltage Vd, wherein the initial electrical polarity of the drive voltage is defined based on the determined magnetic orientation of the resting motor rotor 24.

If the resting motor rotor 24 is oriented in the first rest position RP1, the alternating drive voltage Vd is provided with a positive initial electrical polarity so that a positive electromagnetic field is generated initially which accelerates the resting motor rotor 24 out of the first rest position RP1 toward the first drive position DP1. If the resting motor rotor 24 is oriented in the second rest position RP2, the alternating drive voltage Vd is provided with a negative initial electrical polarity so that a negative electromagnetic field is generated initially which accelerates the resting motor rotor 24 out of the second rest position RP2 toward the second drive position DP2. As visible in a) of FIG. 3, in the present case, the alternating drive voltage Vd is provided with a positive initial electrical polarity because the resting motor rotor 24 is oriented in the first rest position RP1.

The control electronics 28 is configured to continuously monitor, via the current sensor 32, a drive current Id generated in the stator coil 16 by the alternating drive voltage Vd. As visible in FIG. 3, the control electronics 28 is configured to commutate the alternating drive voltage Vd each time the measured drive current Id reaches a predetermined positive current threshold value Itp or a predetermined negative current threshold value Itn. Because the effective value of the drive current Id depends on the present rotational position of the motor rotor 24, the described commutation scheme provides an indirectly rotor-position-controlled commutation of the alternating drive voltage Vd.

Figure 3:
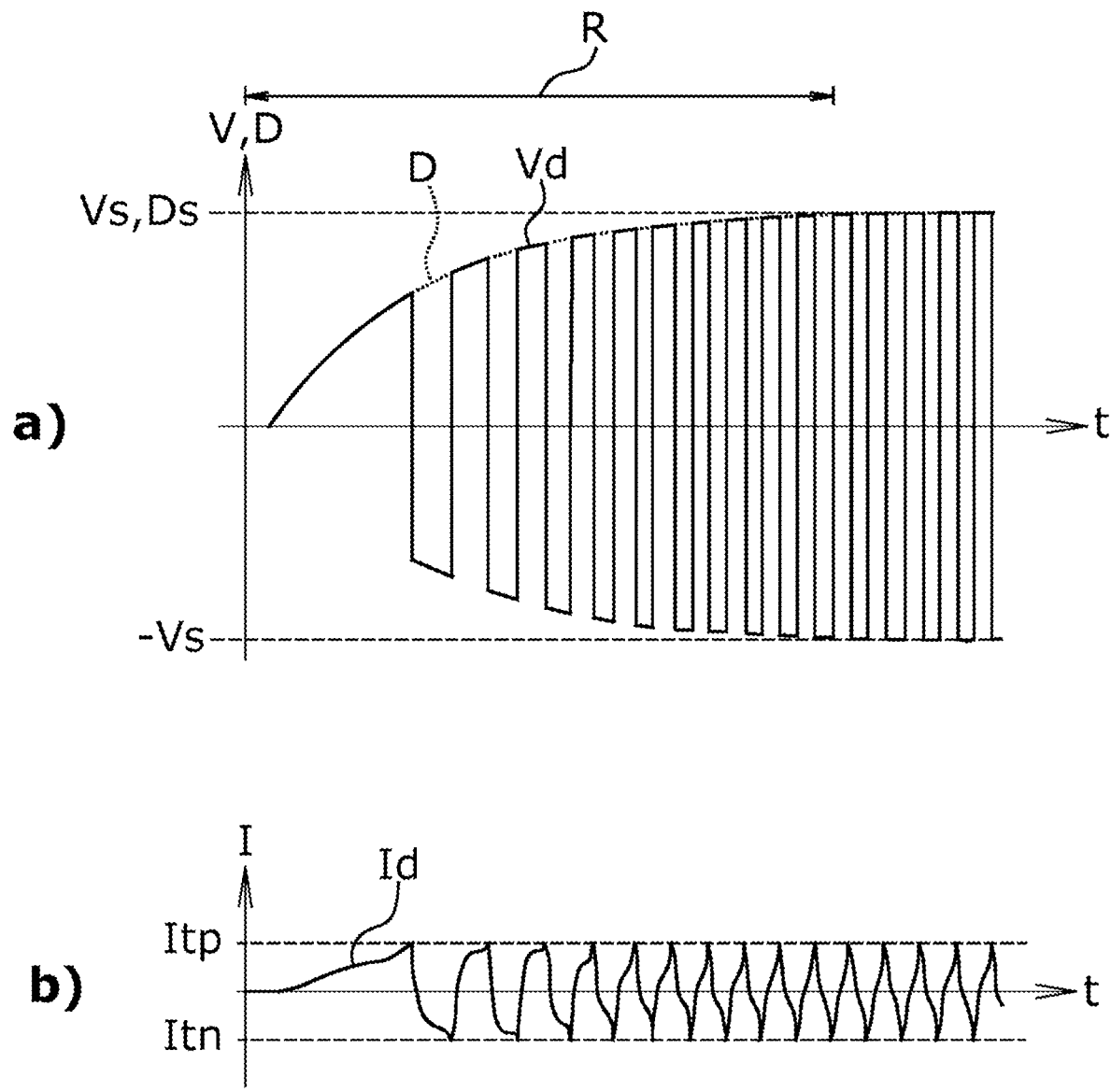
FIG. 3 shows a temporal course of a) the feed voltage and b) the feed current during a rotor acceleration procedure.

As visible in a) of FIG. 3, the control electronics 28 is also configured to continuously increase the duty cycle D of the pulse-width-modulated drive signal PWM up to a predefined set duty cycle Ds during an initial ramp phase R to thereby continuously increase the effective amplitude of the alternating drive voltage Vd up to a predefined set effective voltage amplitude Vs. Because of the current-threshold-controlled commutation of the alternating drive voltage Vd, this also provides a continuously increasing alternation frequency of the alternating drive voltage Vd.

The present invention is not limited to embodiments described herein; reference should be had to the appended claims.

LIST OF REFERENCE NUMERALS

10 Sensorless single-phase electric motor
12 Motor stator
14 Stator body
16 Stator coil
18 First pole leg
20 Second pole leg
22 Bridge portion
24 Motor rotor
26 Power electronics
28 Control electronics
30 Stator connection line
32 Current sensor
D Duty cycle
DP1 First drive position
DP2 Second drive position
Ds Set duty cycle
I Electric feed current
Id Drive current
In Negative detection current pulses
Ip Positive detection current pulses
Itn Negative current threshold value
Itp Positive current threshold value
N Magnetic north pole
P1 First detection parameter
P2 Second detection parameter
PWM Pulse-width-modulated drive signal R Ramp phase
RP1 First rest position
RP2 Second rest position
S Magnetic south pole
t Time
V Effective feed voltage
Vd Alternating drive voltage
Vn Negative detection voltage pulses
Vp Positive detection voltage pulses
Vs Set effective drive voltage amplitude

What is claimed is:

1. A method for starting a sensorless single-phase electric motor,
the electric motor comprising:
  a permanent magnetic motor rotor;
  an electromagnetic motor stator comprising a stator coil;
  a power electronics which is configured to energize the stator coil;
  a current sensor which is configured to measure a current flowing in the stator coil; and
  a control electronics which is configured to control the power electronics, the control electronics being connected with the current sensor,
the method comprising:
  energizing the stator coil with an alternating drive voltage;
  monitoring a drive current which is generated in the stator coil by the alternating drive voltage; and
  commutating the alternating drive voltage whenever the drive current reaches a predefined positive current threshold value or a predefined negative current threshold value.

2. The method as recited in claim 1, wherein,
the alternating drive voltage is generated based on a pulse-width-modulated drive signal, and
a duty cycle of the pulse-width modulated drive signal is continuously increased up to a predefined set duty cycle during a ramp phase.

3. The method as recited in claim 1, further comprising:
detecting an initial rotor orientation by:
  energizing the stator coil with a positive detection voltage pulse which has a positive electrical polarity;
  energizing the stator coil with a negative detection voltage pulse which has a negative electrical polarity;
  measuring a positive detection current pulse which is generated in the stator coil by the positive detection voltage pulse;
  measuring a negative detection current pulse which is generated in the stator coil by the negative detection voltage pulse;
  determining a first detection parameter by evaluating the positive detection current pulse;
  determining a second detection parameter by evaluating the negative detection current pulse; and
  determining a magnetic orientation of the permanent magnetic motor rotor when resting by comparing the first detection parameter with the second detection parameter.

4. The method as recited in claim 3, further comprising:
providing the alternating drive voltage with an initial electrical polarity which is defined based on the magnetic orientation which is determined of the permanent magnetic motor rotor when resting.

5. The method as recited in claim 3, further comprising:
energizing the stator coil with at least three positive detection voltage pulses and with at least three negative detection voltage pulses;
measuring each of the at least three positive detection current pulses and each of the at least three negative detection current pulses;
determining the first detection parameter by adding up maximum absolute values of each of the at least three positive detection current pulses; and
determining the second detection parameter by adding up maximum absolute values of each of the at least three negative detection current pulses.

6. The method as recited in claim 5, further comprising:
providing the alternating drive voltage with an initial electrical polarity which is defined based on the magnetic orientation which is determined of the permanent magnetic motor rotor when resting.

7. A sensorless single-phase electric motor comprising:
a permanent magnetic motor rotor;
an electromagnetic motor stator comprising a stator coil;
a power electronics which is configured to energize the stator coil;
a current sensor which is configured to measure a current flowing in the stator coil; and
a control electronics which is connected with the current sensor,
wherein,
the control electronics is configured to control the power electronics and to start the sensorless single-phase electric motor by:
  energizing the stator coil with an alternating drive voltage,
  monitoring a drive current which is generated in the stator coil by the alternating drive voltage, and
  commutating the alternating drive voltage whenever the drive current reaches a predefined positive current threshold value or a predefined negative current threshold value.

* * * * *